Patented Oct. 13, 1942

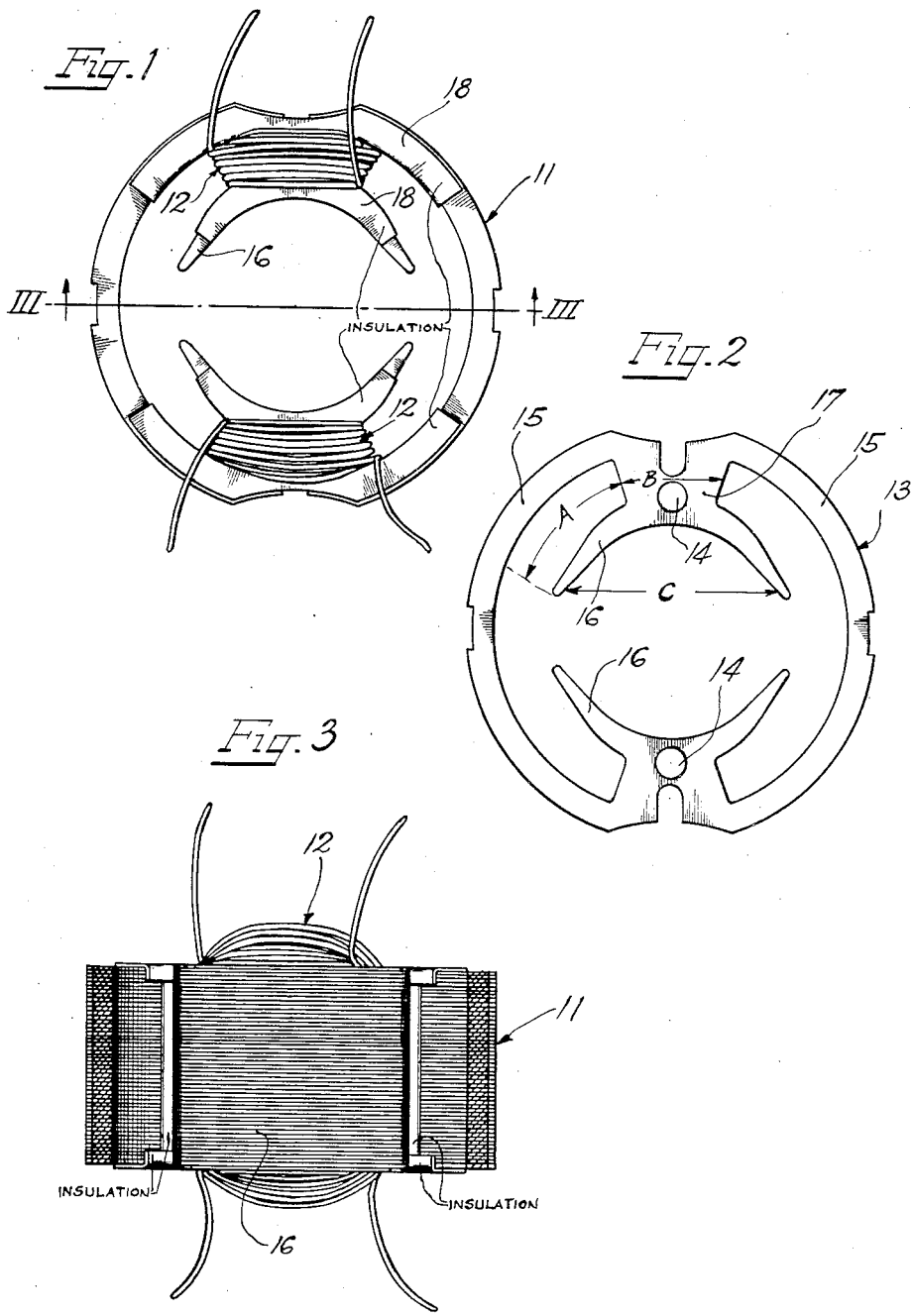

2,298,388

UNITED STATES PATENT OFFICE 2,298,388

LAMINATED FIELD STRUCTURE

Max Knobel, Cambridge, Mass., assignor, by mesne assignments, to Houdaille-Hershey Corporation, Detroit, Mich., a corporation of Michigan Application February 10, 1941, Serial No. 378,199

1 Claim. (Cl. 171—252)

This invention relates to a laminated field structure, and more particularly to the pole design of a laminated field structure for small electric motors.

In the design of small electric motors, and particularly of low voltage direct current fractional horsepower motors, it has been the common practice to form the field structure from a stack of laminations, each lamination including in a single piece the entire cross-section of the field structure. That is to say, a one-piece lamination includes two pole faces, two pole throats and two integral connecting arcuate strips extending between the two pole throats and which thus form a unitary magnetic structure. A laminated field structure made up in this manner with a plurality of one-piece laminations has in the past employed relatively wide throats in comparison with the width of the pole face. This has been necessary in view of the fact that the coils for each pole were slipped over the head of the pole and then pushed down slightly behind the pole to hold the same in place. This pushing down of the coil on two of its four sides naturally causes an extension of the coil at the other two sides. While this type of construction has been satisfactory from several standpoints, including economy of assembly, there has, nevertheless, been several disadvantages. One disadvantage has been the fact that more copper has been employed in the field coil than is necessary due to the relatively wide throat for each pole and due to the fact that two sides of the coil are pushed out away from the shank portion of the pole. It will be remembered that it is not the length of wire which governs but rather the number of ampere turns. The chief disadvantage has been the relatively poor distribution of flux. Since it is desirable to thin out the flux at the leading or entering pole tip, the pole tip has been flared away to increase the air gap at this point.

It is an object of the present invention to provide a novel laminated field structure, having a relatively wide pole face, but a relatively narrow throat, and in which each lamination is formed of a single piece of material.

It is a further object of the present invention to provide a novel laminated field construction which is economical to manufacture and which is extremely efficient in use in an electric machine.

A still further object of the present invention is to provide a field structure lamination in which the cut back portion on each side of a pole is greater than the mean width of the pole throat connecting the pole to the magnetic frame or yoke.

Another and still further object of the present invention is to provide a novel laminated field assembly in which the field structure is formed of a plurality of one-piece laminations, and in which the field coil is tightly wound around a relatively narrow pole throat.

The novel features which I believe to be characteristic of my invention are set forth in particularity in the appended claim. My invention itself, however, both as to its organization and manner of construction, together with further objects and advantages thereof, may best be understood by reference to the following description, taken in connection with the accompanying drawing, in which:

Figure 1 is a front view of a field assembly including a laminated field structure and the field windings thereon;

Figure 2 is a front view of one of the laminations of the laminated field structure shown in Figure 1; and, Figure 3 is a sectional view of the field assembly as taken along the line III—III of Figure 1.

Referring now to the embodiment of the invention which is illustrated in the single sheet of drawings, there is shown a field assembly including a laminated field structure 11 and a pair of field windings 12. The laminated field structure is made up of a stack of laminations 13 which may be conveniently stamped from sheets of magnetic material, and which are held together in any suitable manner such as by pins or bolts (not shown) extending through the holes 14 in the laminations.

From an inspection of Figure 2 of the drawing, it will be noted that the laminations 13 includes a yoke or annular frame portion 15, and two poles 16 which are connected to the yoke or frame portion 15 by a relatively narrow throat portion 17. The cut back portion behind each pole which is represented by the letter A is relatively great as compared to the mean width B of the pole throat 17. This provides a structure in which the flux is thinned out at the pole tips without unduly enlarging the air gap at those points. Indeed, it has been found that the thinning out of the flux is sufficient so that no increase in the air gap is necessitated.

In practice, it has been found desirable to have the width B, as shown in Figure 2, less than the cut back distance A behind the pole 16 on either side of the throat 17. It has furthermore been found desirable to have the distance B, which represents the mean width of the pole throat, less than 50 per cent of the distance between the leading and the trailing tips of the pole face as represented by the letter C. The throat must, of course, on the other hand, be great enough to carry the required flux concentration. One particular relation of dimensions which has been found to have highly satisfactory results is to have the ratio B to C equal approximately .43. In general, it has been found desirable to have the pole throat greater than 25 per cent of the distance between the leading and trailing pole tips.

Each field coil 12 is wound tightly around the throat portion 17, suitable insulation 18 being provided of course between the coil and the metal laminations. While the coil 12 may be wound in any suitable manner around the throat portion 17, and indeed may even be wound by hand, one specific method of rapidly and quickly winding the coil is described in my copending application, Serial No. 395,215, filed May 26, 1941, and assigned to the same assignee as the present invention.

From the above description, it will be apparent that I have provided a novel and efficient type of field assembly for small electric motors. Due to the fact that the throat portion is relatively small in comparison with the pole face, the desired thinning of flux at the leading pole tip is obtained without flaring the pole tip a substantial distance away from the rotor to obtain a widened air gap. It will further be observed that much less copper is needed for the field coil for the same number of ampere turns than has been employed in previous constructions.

While I have shown a particular embodiment of my invention, it will, of course, be understood that I do not wish to be limited thereto, since many modifications may be made, and I therefore contemplate by the appended claim to cover all such modifications as fall within the true spirit and scope of my invention.

I claim as my invention:

A laminated core structure embodying a plurality of laminations with each lamination including a yoke portion and a plurality of poles integral with the yoke, each of said poles having a throat portion with peripherally spaced inwardly converging straight sides terminating at outwardly extending pole face pieces of equal length, the minimum width of said throat portion being between twenty-five per cent and fifty per cent of the length of straight line connecting the oppositely extending tips of said pole pieces, and a winding about said throat portion defining a coil having its greatest diameter adjacent the yoke and its least diameter adjacent the pole pieces.

MAX KNOBEL.